March 3, 1970     L. LEICHTL     3,498,672
VEHICLE HEADREST CONSTRUCTION
Filed March 5, 1968     3 Sheets-Sheet 3

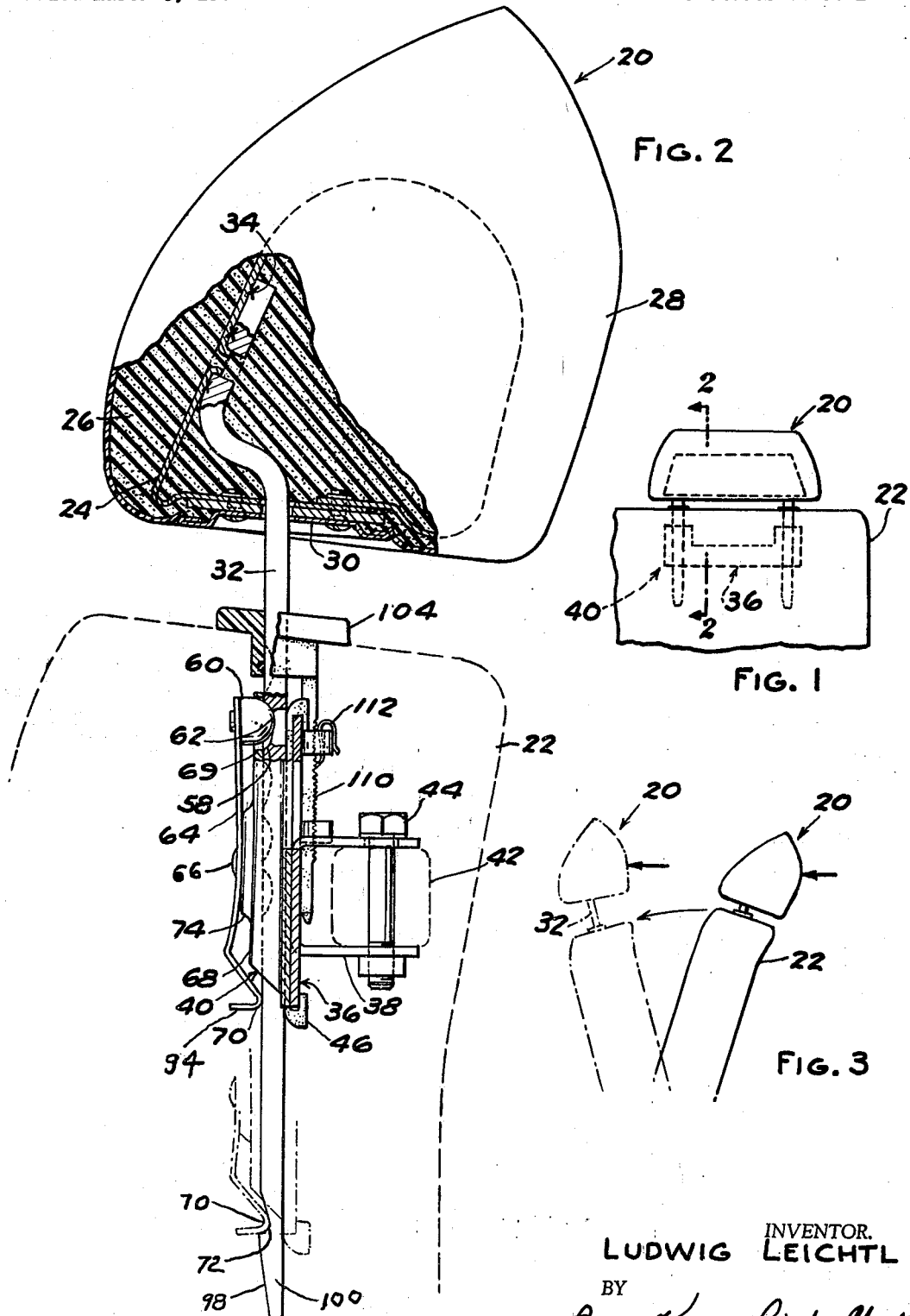

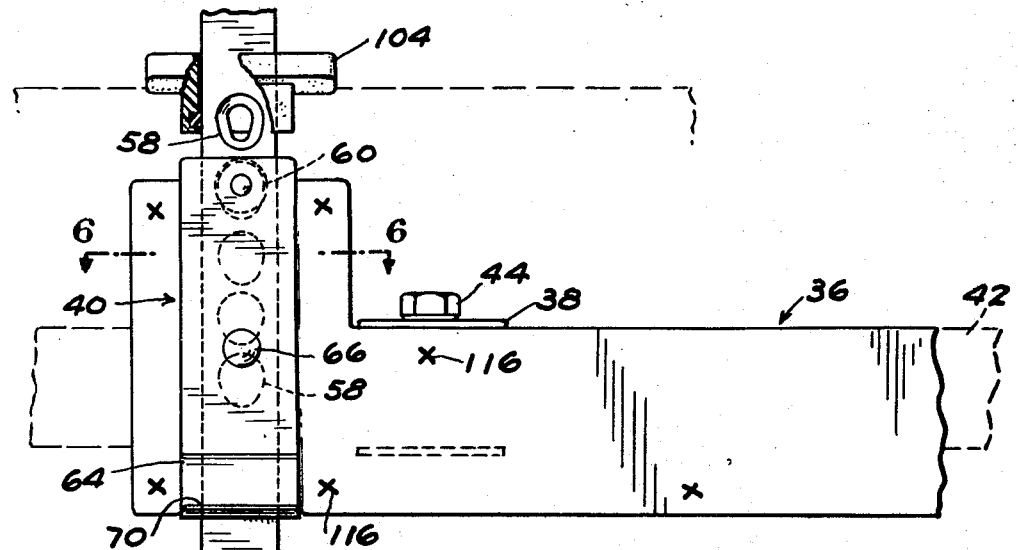
FIG. 4
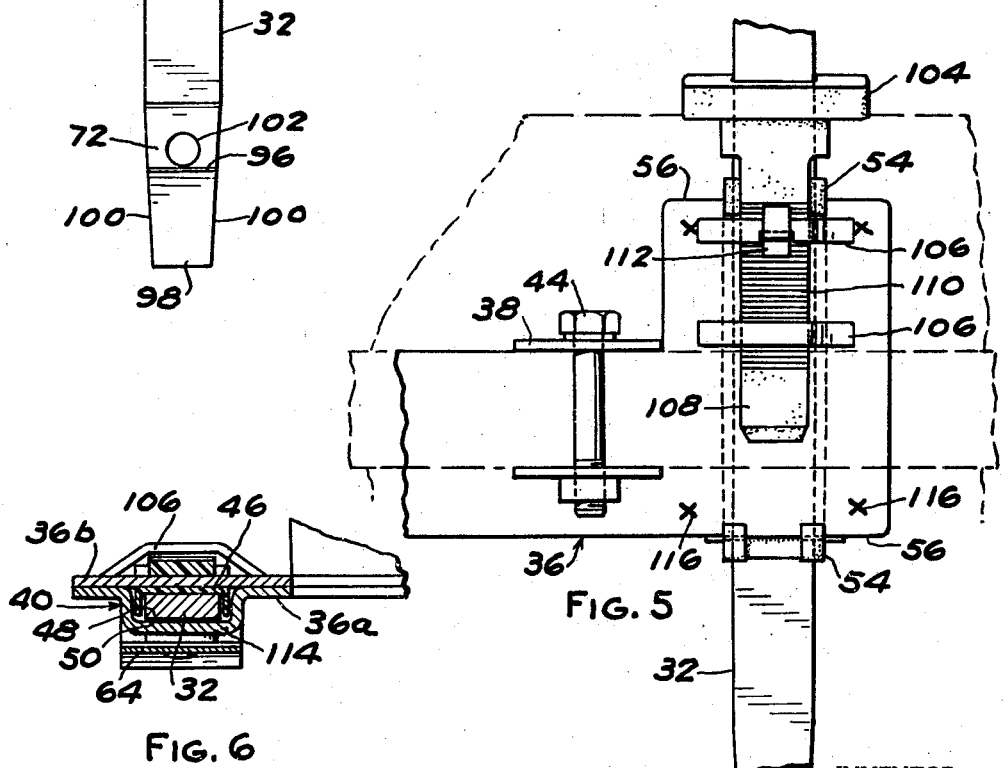
FIG. 6
FIG. 5
INVENTOR.
LUDWIG LEICHTL
BY
ATTORNEYS

INVENTOR.
LUDWIG LEICHTL
BY
ATTORNEYS

United States Patent Office 3,498,672
Patented Mar. 3, 1970

3,498,672
VEHICLE HEADREST CONSTRUCTION
Ludwig Leichtl, Emmaus, Pa., assignor to L. F. Grammes and Sons, Incorporated, Allentown, Pa., a corporation of Maryland
Filed Mar. 5, 1968, Ser. No. 710,467
Int. Cl. A47c 7/36
U.S. Cl. 297—410         24 Claims

ABSTRACT OF THE DISCLOSURE

A head rest for a vehicle seat which includes a headrest carrier member having two substantially parallel adjustable support arms, each with a series of spaced detent cavities which slidably engage within two guideways rigidly attached to a base member mounted within a vehicle seat back. Each guideway has a resiliently biased detent which engages the the cavities of the support arms to restrain and control the vertical movement of the headrest relative to the seat back.

BACKGROUND OF THE INVENTION

Figure 7:
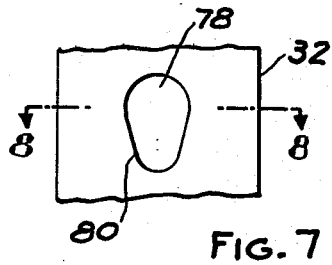

This invention relates to headrests for vehicle seats and more particularly to an improved headrest adjustment mechanism.

In prior art headrest adjustment mechanisms there have been problems in fabricating and aligning the headrest support arms with the guideways on the seat back so that the mechanism operates smoothly and efficiently. Another problem associated with prior art mechanisms is retaining the headrest on the seat back when it is struck from the rear by a passenger or another object during a collision so that it will not become disconnected, strike and possibly injure a person sitting in the seat.

This invention solves the above and other problems by providing a structure with two spaced substantially parallel support arms rigidly attached to a shell and each having a series of spaced detent cavities. The shell provides a superstructure around which a foam pad and outer skin of a vinyl or fabric material are wrapped and attached to form a headrest. The support arms of the headrest slidably engage two fixedly spaced guideways on a rigid base member which is mounted within the seat back. A pair of resiliently mounted detents engage the cavities in the support arms to restrain and control the vertical movement of the headrest. Inserts are mounted in each guideway so that they can be shifted laterally with respect to both the guideways and the support arms. This lateral movement compensates for manufacturing tolerances and minor errors in the spacing or alignment and the parallelism of the support arms or guideways or both. In addition, a spring latch is provided for each support arm which prevents accidental separation of the headrest from the mounting base but enables the headrest to be easily removed when desired.

This invention relates to a headrest for a vehicle seat and more particularly to an improved headrest adjustment mechanism.

A principal object of this invention is to provide an improved headrest support and adjustment mechanism in which the forces required to raise and lower the headrest relative to the vehicle seat on which it is used can be independently determined.

Another object of this invention is to provide a headrest adjustment mechanism which compensates and corrects for misalignment of the components of the mechanism.

Another object of this invention is to provide a lock arrangement on a headrest adjustment mechanism which prevents unintentional separation of the headrest from the seat, such as when the headrest receives an impact from a rear seat passenger as a result of a collision, but which enables the headrest to be readily removed from the seat when desired.

Another object of this invention is to provide a headrest assembly fabricated primarily from stamped rather than machined parts and thus is of economical construction.

Other objects and features of this invention will be apparent from the following description and claims in which is disclosed the manner of making and using the invention and the best mode contemplated by the inventor for carrying out the invention.

Drawings accompany this disclosure and the various views thereof may be described as:

FIGURE 1, a front elevational view of a portion of the back section of a vehicle seat with the headrest of this invention mounted thereon.

FIGURE 2, a section taken on line 2—2 of FIGURE 1.

FIGURE 3, a side elevational view of two positions of the back portion of the seat shown in FIGURE 1.

FIGURE 4, a fragmentary front elevational view of the adjustment mechanism of the headrest.

FIGURE 5, a rear elevational view of the adjustment mechanism.

FIGURE 6, a view partially in section taken on line 6—6 of FIGURE 4.

FIGURE 7, a fragmentary top view of one of the support arms at an intermediate stage of fabrication.

Figure 8:
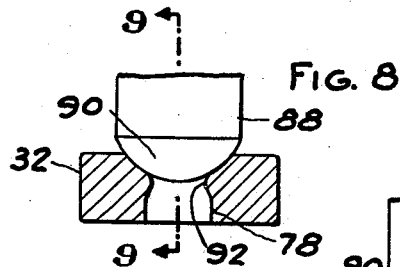

FIGURE 8, a sectional view on line 8—8 of FIGURE 7 showing the manner in which the finished shape of the detent cavities on the support arms is obtained.

Figure 9:
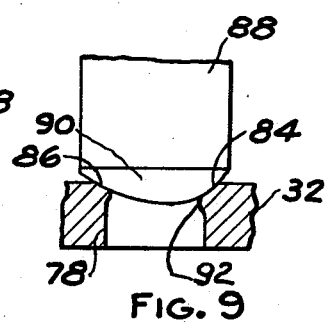

FIGURE 9, a view partially in section taken on line 9—9 of FIGURE 8.

Figure 10:
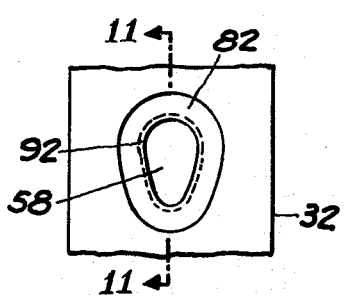

FIGURE 10, a fragmentary top view of one support arm showing the finished detent cavity therein.

Figure 11:
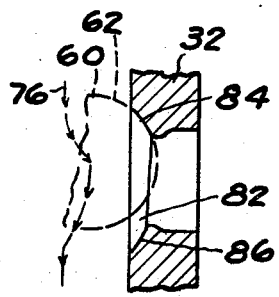

FIGURE 11, a sectional view on line 11—11 of FIGURE 10 showing the differential rate of detent displacement provided by the detent control surface on the detent cavity.

Figure 12:
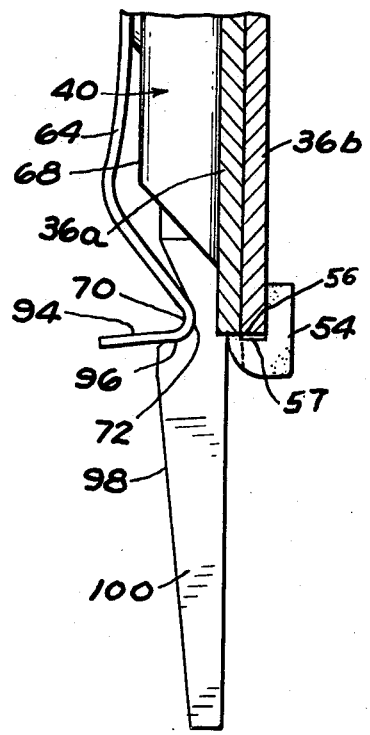

FIGURE 12, a fragmentary side view partially in section of the lower portion of one of the support arms and the lock mechanism therefor.

Figures 13, 14:
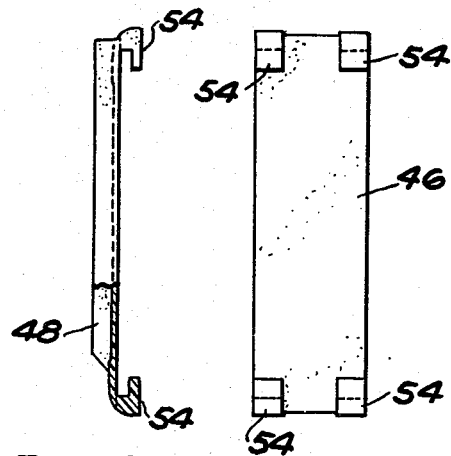

FIGURE 13, a side elevational view partially in section of a guide insert for the support arms.

FIGURE 14, a rear elevational view of the guide insert shown in FIGURE 13.

Referring to the drawings in FIGURES 1 and 2, a headrest, generally designated as 20, is mounted on a back portion 22 of a seat for vertical adjustment with respect to the seat. Headrest 20 includes a carrier member 24 preferably in the form of a sheet metal shell which is embedded in a foam pad 26 with an outer skin of vinyl or fabric 28 which is wrapped around the foam pad and secured to the shell by a clamping plate 30 to form the padded headrest 20. Two adjustable support arms 32 extend downwardly from the headrest 20 in substantially parallel spaced relation to each other and are rigidly attached to the shell 24 at 34 by a suitable means such as welding. A base member 36 with a pair of mounting brackets 38 and a pair of guideways 40 for slidably receiving support arms 32 is mounted on an anchor member 42 in the back portion of the seat by a nut and bolt assembly 44.

As shown in FIGURES 1 and 4, support arm guideways 40 are in substantially parallel spaced relationship to each other and rigidly attached to base member 36. As shown in FIGURE 6, each guideway 40 contains an alignment guide insert 46 which is formed from a low friction plastic material such as nylon. In the preferred embodiment of this device each alignment guide 46 is formed with a generally U-shaped configuration with parallel sides 48 of the U being positioned so that there is a clearance space or gap 50 between each side 48 of the alignment guide and the adjacent surface of support arm 32. Thus each support arm 32 can shift laterally with respect to the longitudinal center line of its respective alignment guide 46. Spaces or gaps 50 between alignment guide 46 and support arm 32 allow the support arm to be displaced slightly both laterally and angularly or rotationally with respect to alignment guide 46. This lateral and angular displacement compensates for any small errors in the lateral spacing or parallel alignment of arms 32 when they are secured to the shell 24. Preferably the device is dimensioned so that there is also a clearance space or gap 52 between sides 48 of alignment guides 46 and adjacent surfaces of guideways 40. Spaces 52 allow each alignment guide 46 to be laterally displaced with respect to the longitudinal center line of its respective guideway 40 to provide additional correction for lateral misalignment between support arms 32 and guideways 40. As shown in FIGURES 13 and 14, alignment guides 46 are formed with tabs or hooks 54 at opposite ends which engage around end edges 56 (as shown in FIGURE 5) of guideways 40 to retain guides 46 in guideways 40. As shown in FIGURE 12, spaces 57 between hooks 54 and edges 56 provide adequate clearance so that guides 46 while inserted in guideways 40 can be angularly displaced or rotated about two or three degrees in the plane of base member 36. This rotational movement compensates for any slight angular misalignment of arms 32 with guideways 40.

Each support arm 32 (FIGURES 2 and 4) is formed with a plurality of detent cavities 58 adapted to be engaged by a detent 60 displaceably mounted on base member 36 to retain the headrest in a selected position of vertical adjustment. Cavities 58 are shaped to control the forces required to raise and to lower the headrest with respect to base 36. Each detent 60 has a generally semispherical free end 62 and is mounted at the upper end of a leaf spring 64 which is secured as by a rivet 66 intermediate its ends to front wall 68 of guideway 40. The lower end of each leaf spring 64 is fashioned as a detent 70 which, when the headrest is in the fully raised position, is adapted to engage a cavity or notch 72 adjacent the lower end of each support arm 32.

Spring 64 is retained on forwardly embossed portion 74 of front wall 68 by rivet 66 so that the spring as a whole is permitted to rotate slightly about rivet 66 as center. This enables detent 60 to shift laterally a slight extent and thus engage all cavities 54 even though the two support arms 32 may be slightly misaligned with respect to the longitudinal center lines of guideways 40. The upper edge of front wall 68 is notched as at 69 to accommodate detent 60.

In the preferred embodiment of this device cavities 58 are formed so that in cooperation with resiliently biased detents 60 they provide a greater restraining influence on the movement of the arms downwardly than they do when the headrest is raised. Cavities 58 are formed in this manner to compensate for the weight of the headrest and shell 24 so that the total force required to raise the headrest is substantially the same as that required to lower it. As shown in FIGURE 11, this differential force is developed by utilizing the shape of cavity 58 to vary the rate of displacement of detent 60 against the bias of spring 64 per unit of longitudinal travel of arms 32. Line 76 indicates the path of travel of detent 60 through cavity 58. The variable rate of displacement of detent 60 could be provided simply by a generally teardrop-shaped opening 78 through support arm 32 as shown in FIGURE 7 wherein the side wall 80 of the opening extends straight through the support arm. Since opening 78 is wider at one end than at the other it would require more force to displace detent 60 from the cavity formed by opening 78 when the support arm is shifted so that the wider end of the opening abuts detent 60 than when the arm is shifted so that the narrower end of opening 78 moves toward the detent. The narrower end of opening 78 displaces detent 60 in a direction out of the opening gradually when arm 32 is shifted vertically in one direction whereas the wider end of opening 78 causes the detent to be shifted out of the opening abruptly when the arm is shifted vertically in the opposite direction. However, the straight wall 80 of opening 78 would provide only "point" contact between the edge of opening 78 and the generally semispherical surface 62 at the end of detent 60 which would through repeated adjustment of the headrest tend to wear a groove in detent 60. Therefore, in the preferred embodiment of this device each cavity 58 is formed with a side wall having a detent displacement control surface 82 which is contoured to conform in shape with the portion of the end surface 62 of detent 60 with which it is immediately adjacent as the detent shifts longitudinally relative to and within the cavity. Control surface 82 is in the nature of a cam surface, the slope of which varies in a direction longitudinally of the cavity. For example, referring to FIGURE 11, at the wider end of the cavity where the detent is located inwardly of the cavity to its greatest extent, cam surface 82 is shaped to conform to a portion of detent surface 62 which is spaced from the extreme free end of the detent 60. The inclination of the cam surface 82 at the wider end of the cavity is indicated at 84. However, as the detent 60 shifts towards the narrower end of cavity 58 it is displaced outwardly of the cavity as shown in FIGURE 11 and, thus, at the narrower end of the cavity the cam surface 82 conforms to a portion of end surface 62 of detent 60 which is closely adjacent the free end of the detent. In FIGURE 11 the lesser inclination of the cam surface at the narrower end of the cavity is indicated at 86. As detent 60 shifts longitudinally in cavity 58 in a direction from the wider end to the narrower end, it is displaced in a direction outwardly of the cavity along a path designated by arrows 76. Between the portions 84 and 86 of cam surface 82 the slope of the cam surface progressively diminishes. Thus, as detent 60 shifts along the path designated 76, the end surface 62 remains in at least line contact with cam surface 82 and the tendency for scoring of the detent is eliminated. The tendency of the detent to resist scoring is enhanced by the fact that it is formed of a low friction plastic material such as nylon.

In the preferred embodiment of the invention, each cavity 58 is formed in the manner illustrated in FIGURES 7, 8 and 9. First a series of tear-shaped openings 78 are punched through the support arm. Thereafter each of these openings is coined around its periphery to produce cam surface 82. The tool for coining these openings is in the form of a punch 88 illustrated in FIGURES 8 and 9. Punch 88 has a generally rounded lower end 90 which in horizontal section conforms in shape to openings 78. The shape of end 90 in a direction transverse of the longitudinal axis of support arm 32 is illustrated in FIGURE 8 and the shape of the end of the punch in a direction longitudinally of support arm 32 is illustrated in FIGURE 9. When punch 88 is driven downwardly into opening 78, end 90 thereof causes the metal around the edge of opening 78 to flow in a direction radially inwardly and downwardly of opening 78. The displaced metal forms a radially inwardly extending rib 92 around the inner periphery of cavity 58. It will be appreciated that by forming a cavity 58 and cam surface 82 thereof in this manner no machining operations are required and the side guiding edges of support arm 32 need not be trimmed since the direction of metal displacement is inwardly rather than laterally outwardly.

As shown in FIGURE 3, it has been found that if, during a collision or sudden stopping of a vehicle, a passenger or some other object strikes the rear of a headrest mounted on the back of a forwardly folding seat, the headrest may be thrown upwardly and forwardly. If not restrained, the headrest may become completely separated from the seat back, strike a front seat passenger and cause serious injury. The headrest of the present invention is prevented from being thrown free of the seat back by the interengagement of detents 70 at the lower ends of springs 64 with notches 72 adjacent the lower ends of arms 32. Each detent 70 is formed at its lower end with a leg 94 extending generally transversely of the longitudinal axis of support arm 32. Each notch 72 is formed with a cam surface 96 at its lower end which serves as a shoulder which engages leg 94 of detent 70 to arrest upward travel of arm 32. The inclination of shoulder 96 is such as to prevent accidental separation of the headrest from the seat but permits removal of the headrest when desired by manually exerting a strong upward pull on the headrest, a pull of from 80 to 120 pounds or more for example. The force required to remove the headrest from the seat can be controlled by varying the inclination of shoulder 96.

In the preferred embodiment of this device the lower ends of support arms 32 are tapered at 98, 100 (FIGURES 2, 4 and 12) to facilitate insertion of the arms into alignment guides 46 in guideways 40. Tapered surface 98 and notches 72 are formed by a coining or stamping operation and the excess metal is subsequently trimmed from the arm by shearing when tapered surfaces 100 are formed. To facilitate the metal flow during the coining of notch 72 and surface 98, an opening 102 is first blanked or pierced in each arm 32.

In the preferred embodiment of this mechanism an apertured escutcheon plate 104 is provided to trim and conceal the openings formed in the trim fabric on the seat back to accommodate support arms 32. In order to accommodate seats of different dimensions escutcheon 104 is attached to base member 36 so that it can assume a variety of heights with respect to the base member. As shown in FIGURE 5, base member 36 has two sheared sheet metal tabs 106 adjacent each guideway 40 which form a slot into which a finger 108 on escutcheon 104 can be inserted. Finger 108 has a plurality of serrated teeth 110 positioned to engage the tip of sheet metal spring clip 112 which is attached to one of the sheet metal tabs 106. This construction provides both a means of positioning and guiding the escutcheon 104 and a means for attaching it to base member 36 in such a manner that it can be used to cover openings in the tops of seat backs which are at a variety of heights from base member 36.

Base member 36 is preferably formed as two sheet metal stampings, a front plate 36a and a rear plate 36b. Rear plate 36b is generally flat except for the sheared tabs 106. Front plate 36a is also generally flat except that adjacent its opposite ends it is formed with channel sections 114 which when the plates are juxtaposed and spot welded together as shown at 116 form the previously referred to guideways 40 (FIGURE 6).

It will be observed that in the headrest construction disclosed all the metal parts, including support arms 32, have been designed so that they can be formed by simple stamping or coining operations and costly machining operations are thereby avoided. Thus economy is achieved without sacrificing strength, rigidity or smooth operation. The utilization of the rigid base member 36 which maintains the two support arm guideways in fixed spaced apart relation imparts rigidity and strength to the whole assembly. The use of the inserted adjustment guides 46 not only enables the guideways to be formed from sheet metal stampings but, as previously indicated, allows for a certain amount of misalignment while permitting smooth operation.

I claim:

1. In a vehicle headrest construction of the type which includes a headrest support arm adapted for vertical sliding movement in a guideway on a base adapted to be mounted on a seat back, the improvement which comprises:
    (a) a vertically extending series of detent cavities in the support arm, each cavity being tapered in width so that the major axis of the cavity extends longitudinally of the support arm and the minor axis extends transversely thereof,
    (b) a detent having a tapered end portion adapted to engage within the cavities, the transverse dimension of said end portion being substantially at least as great as the minor axis of the cavities, and
    (c) means resiliently biasing the detent for engagement with the cavities when the arm is shifted vertically in said guideway,
whereby the support arm is retained in selective positions of vertical adjustment.

2. The improvement defined in claim 1 in which the cavities are narrower at their lower ends than at their upper ends.

3. The improvement defined in claim 1 in which the cavities have inwardly tapered side walls which are contoured to mate with the tapered end portion of the detent and thereby provide substantial contact with the tapered end portion of the detent when the detent shifts horizontally out of a cavity in response to vertical movement of the suppor arm relative to the detent.

4. The improvement defined in claim 3 wherein each cavity has a teardrop-shaped periphery.

5. The improvement defined in claim 4 wherein the end portion of the detent is generally semi-spherical.

6. The improvement defined in claim 1 in which the arm has generally flat opposed faces with the cavities extending through the arm in a direction generally normal to said faces, each cavity having a side wall portion adjacent the face opposite the detent which is substantially perpendicular to said last-mentioned face and having a side wall portion adjacent the face of the arm engaged by the detent which is contoured to mate with the tapered end portion of the detent.

7. The improvement defined in claim 6 wherein the arm comprises a metal bar and the junction of the two wall portions of the cavity is defined by a bead which extends radially inward of the perpendicular side wall portion.

8. The improvement defined in claim 7 wherein the bead comprises metal which has been dispaced radially inward.

9. A headrest construction for a vehicle seat back which comprises:
    (a) a base member adapted to be mounted on the seat back and having two vertically extending substantially parallel spaced guideways rigidly attached thereto,
    (b) a headrest carrier member having two substantially parallel depending support arms spaced for vertical sliding engagement with the guideways and rigidly attached to the carrier member with each arm having a vertically extending series of detent cavities therein,
    (c) a pair of detents on the base member adapted for selective engagement with the cavities, and
    (d) an insert formed of a low friction material interposed between each arm and its associated guideway, each of said arms being smaller in cross section than its associated guideway,
whereby the detents retain the carrier member in selected positions of vertical adjustment.

10. A headrest construction as defined in claim 9 wherein the guideway insert and support arm are dimensioned such that there is a slight clearance between both the guideway and the insert and the insert and the arm, whereby the insert can be laterally displaced slightly with respect to both the arm and the guideway to compensate for slight misalignment between the arms and the guideways.

11. A headrest construction as defined in claim 9 wherein the insert and the arm are dimensioned such that there is a slight clearance between the arm and the insert, whereby the arm can be laterally displaced slightly with respect to the insert to compensate for slight misalignment between the arms and the guideways.

12. A headrest construction as defined in claim 9 in which the cross-sectional shape of each support arm is generally rectangular.

13. A headrest construction for a vehicle seat back which comprises:
   (a) a base member adapted to be mounted on the seat back and having two vertically extending, substantially parallel spaced guideways immovably, permanently and rigidly attached thereto,
   (b) a headrest carrier member having two substantially parallel depending support arms spaced for vertical sliding engagement with the guideways and immovably, permanently and rigidly attached to the carrier member with each arm having a vertically extending series of detent cavities therein,
   (c) a pair of detents on the base member adapted for selective engagement with the cavities,
whereby the detents retain the carrier member in selected positions of vertical adjustment.

14. A headrest construction for a vehicle seat back which comprises:
   (a) a base member adapted to be mounted on the seat back, said base member comprising a substantially flat rigid plate, said plate having channel-shaped members rigidly secured thereto and cooperating with portions of said plate to define substantially parallel spaced guideways,
   (b) a headrest carrier member having two substantially parallel depending support arms spaced for vertical sliding engagement with the guideways and rigidly attached to the carrier member with each arm having a vertically extending series of detent cavities therein, said plate spanning said arms, and
   (c) a pair of detents on the base member adapted for selective engagement with the cavities,
whereby the detents retain the carrier member in selected positions of vertical adjustment.

15. A headrest construction as defined in claim 9 in which the cross-sectional shape of the support arm is generally rectangular and in which the insert has at least three substantially flat surfaces arranged in a generally U-shaped configuration with the two side surfaces of the U being substantially parallel to each other and substantially normal to the third surface of the U.

16. A headrest construction for a vehicle seat back which comprises:
   (a) a base member adapted for mounting in a seat back, said base member being formed as a substantially flat rigid plate having channel-shaped members rigidly secured thereto and cooperating with portions of the plate to define two vertically extending spaced substantially parallel rectangular guideways,
   (b) a pair of low friction inserts in said guideways each having a generally U-shaped configuration of such dimensions that there is a slight clearance between the sides of the U-shaped insert and the adjacent sides of the guideway with the insert mounted for slight lateral displacement in the guideway,
   (c) a headrest carrier member having two substantially parallel depending rectangular support arms spaced for vertical movement within the inserts and guideways with each arm dimensioned for a slight clearance between the sides of the U insert and the adjacent sides of the rectangular support arm for slight lateral displacement of each support arm with respect to the U insert,
   (d) a series of longitudinally spaced detent cavities formed within each arm,
   (e) a pair of spring biased detents each having a semispherical end portion mounted on the base member for engagement with the cavities and for lateral displacement with respect to the longitudinal center line of each guideway,
   (f) each of said cavities extending through the arm in a direction generally normal to the plane containing the flat rigid plate and the arms in assembly, each cavity having a side wall portion adjacent to a face of the arm opposite the detent which is substantially perpendicular to said opposite face and having a side wall portion adjacent the face of the arm engaged by the detent which is contoured to correspond with an arc of the spherically-shaped end of the detent, the junction of said two wall portions being defined by a bead which extends radially inward of the perpendicular side wall portions,
   (g) a detent cavity adjacent to the lower end of each of the arms, and
   (h) a second pair of spring biased detents mounted on the base member for cooperation with the last-mentioned detent cavities, said spring biased detents and said detent cavities being designed such that it requires the application of a substantially greater upward force to the headrest carrier member to disengage the second pair of detents from the second-mentioned activities than to disengage the first-mentioned detents from the cavities in said series.

17. A headrest construction for a vehicle seat back which comprises:
   (a) a base member adapted to be mounted on the seat back, said base member comprising a rigid metal stamping having channel sections comprising substantially parallel spaced guideways,
   (b) a headrest carrier member having two substantially parallel depending support arms spaced for vertical sliding engagement with the guideways and rigidly attached to the carrier member with each arm having a vertically extending series of detent cavities therein, and
   (c) a pair of detents on the base member adapted for selective engagement with the cavities,
whereby the detents retain the carrier member in selected positions of vertical adjustment.

18. In a vehicle headrest construction of the type which includes a headrest with at least two support arms each adapted for vertical sliding movement in guideways on a base, the base being adapted for mounting on a seat back, the improvement which comprises an insert disposed between each arm and its associated guideway, the relative sizes of the guideways, arms and inserts providing a slight clearance between the guideways and the inserts and between the inserts and the arms, whereby each insert can be laterally displaced with respect to both its associated arm and guideway to compensate for misalignment between the arms and the guideways.

19. In a headrest construction of the type which includes a headrest member secured to the upper end of a support arm guided for vertical sliding movement on a base adapted to be mounted on a vehicle seat back and means for yieldably restraining the headrest in at least one position of vertical adjustment, the improvement comprising means for preventing unintentional separation of the headrest from said base which consist of a yieldably biased latch on said base, a latch cavity in the arm in which said latch is adapted to engage when the headrest member is shifted upwardly to a predetermined position above said position of vertical adjustment, said latch cavity and latch being contoured such that when interengaged it requires the application of a relatively greater manual force to shift the headrest upwardly beyond said predetermined position than the force required to move the headrest to said position of vertical adjustment.

20. The improvement defined in claim 19 in which the means for yielding restraining the headrest comprises a series of detent cavities spaced lengthwise on the arm, a spring biased detent on said base adapted to interengage with said cavities to hold said headrest in a selected position of vertical adjustment at a level below said predetermined position, said detent cavities and spring biased detent being designed to require the application of a vertical force on the headrest to change the vertical adjustment thereof which is substantially less than the manual force required to shift the headrest upwardly beyond said predetermined position.

21. In a headrest construction of the type which includes a headrest member secured to the upper end of a support arm guided for vertical sliding movement on a base adapted to be mounted on a vehicle seat back, that improvement which comprises a spring latch on said base, a cavity in the arm in which said spring latch is adapted to engage when the headrest member is shifted upwardly to a predetermined position, said cavity and spring latch being contoured such that when interengaged it requires the application of a relatively great manual force to shift the headrest upwardly beyond said predetermined position, said arm also being provided with a series of detent cavities spaced lengthwise thereof, a spring biased detent on said base adapted to interengage with said cavities to hold said headrest in a selected position of vertical adjustment at a level below said predetermined position, said detent cavities and spring biased detent being designed to require the application of a vertical force on the headrest to change the vertical adjustment thereof which is substantially less than the manual force required to shift the headrest upwardly beyond said predetermined position, said spring latch and said spring latch biased detent comprising a leaf spring extending vertically on said base and secured thereto intermediate the upper and lower ends of the spring, the upper end portion of the spring having said detent secured thereto and the portion of the spring below its connection with the base comprising said spring latch.

22. In a headrest construction of the type which includes a headrest member secured to the upper end of a support arm guided for vertical sliding movement on a base adapted to be mounted on a vehicle seat back, that improvement which comprises a spring latch on said base, a cavity in the arm in which said spring latch is adapted to engage when the headrest member is shifted upwardly to a predetermined position, said cavity and spring latch being contoured such that when interengaged it requires the application of a relatively great manual force to shift the headrest upwardly beyond said predetermined position, said cavity having a shoulder at its lower end which extends generally perpendicular to the vertical axis of the arm and the spring latch includes an abutment at the lower end thereof which generally mates with said shoulder when engaged in said cavity.

23. In a headrest construction of the type which includes a headrest member secured to the upper end of a support arm guided for vertical sliding movement on a base adapted to be mounted on a vehicle seat back, that improvement which comprises a spring latch on said base, a cavity in the arm in which said spring latch is adapted to engage when the headrest member is shifted upwardly to a predetermined position, said cavity and spring latch being contoured such that when interengaged it requires the application of a relatively great manual force to shift the headrest upwardly beyond said predetermined position, said series of detent cavities being located on said arm above said spring latch cavity.

24. A headrest construction for a vehicle seat as defined in claim 9 wherein each insert and its associated guideway are dimensioned such that there is a slight clearance between the guideway and the insert, whereby the insert can be laterally displaced slightly with respect to the guideway to compensate for slight misalignment between the arms and the guideways.

References Cited
UNITED STATES PATENTS

| | | | |
|---|---|---|---|
| 3,063,751 | 11/1962 | Hatch | 297—410 |
| 3,159,427 | 12/1964 | Lawson | 297—410 |
| 3,366,417 | 1/1968 | Belk | 297—410 X |
| 3,403,938 | 10/1968 | Cramer et al. | 297—396 X |

CASMIR A. NUNBERG, Primary Examiner

U.S. Cl. X.R.

297—397